(12) United States Patent
Spadone et al.

(10) Patent No.: US 7,337,815 B2
(45) Date of Patent: Mar. 4, 2008

(54) TIRE WITH TREAD OF RUBBER COMPOSITION CONTAINING DIVERSE CARBON BLACKS

(75) Inventors: Leighton Randolph Spadone, Beachwood, OH (US); Paul Harry Sandstrom, Cuyahoga Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 466 days.

(21) Appl. No.: 10/761,173

(22) Filed: Jan. 20, 2004

(65) Prior Publication Data

US 2005/0159535 A1 Jul. 21, 2005

(51) Int. Cl.
  *B60C 1/00* (2006.01)
  *C08K 3/04* (2006.01)
(52) U.S. Cl. .................. 152/209.1; 152/905; 523/220; 524/492; 524/495; 524/496; 524/571
(58) Field of Classification Search ................ 524/496; 152/209.1, 905; 523/220
  See application file for complete search history.

(56) References Cited

U.S. PATENT DOCUMENTS

| | | | |
|---|---|---|---|
| 4,683,928 A * | 8/1987 | Yahagi .................... | 152/209.5 |
| 5,430,087 A | 7/1995 | Carlson et al. ............. | 524/496 |
| 5,798,405 A | 8/1998 | Zimmer et al. ............. | 524/496 |
| 6,220,323 B1 * | 4/2001 | Sandstrom et al. ...... | 152/209.5 |
| 2002/0111416 A1 * | 8/2002 | McNutt et al. ............. | 524/496 |

FOREIGN PATENT DOCUMENTS

| | | |
|---|---|---|
| EP | 814124 | 12/1997 |
| EP | 941872 | 9/1999 |
| JP | 08188672 A  * | 7/1996 |

OTHER PUBLICATIONS

Machine translation of JP 08-188672, Jul. 23, 1996.*

* cited by examiner

*Primary Examiner*—Vasu Jagannathan
*Assistant Examiner*—Vickey Ronesi
(74) *Attorney, Agent, or Firm*—Henry C. Young, Jr.

(57) ABSTRACT

The invention relates to a tire with a component composed of a rubber composition containing at least two diverse carbon blacks. In one aspect such tire is a heavy tire and such component is a tread for a heavy tire which contains at least two diverse carbon blacks to aid in providing an improved path for thermal conductivity for a heavy tire with its relatively thick cross section such as, for example, its relatively thick tread.

4 Claims, 1 Drawing Sheet

TIRE WITH TREAD OF RUBBER COMPOSITION CONTAINING DIVERSE CARBON BLACKS

FIELD OF THE INVENTION

Figure 1:
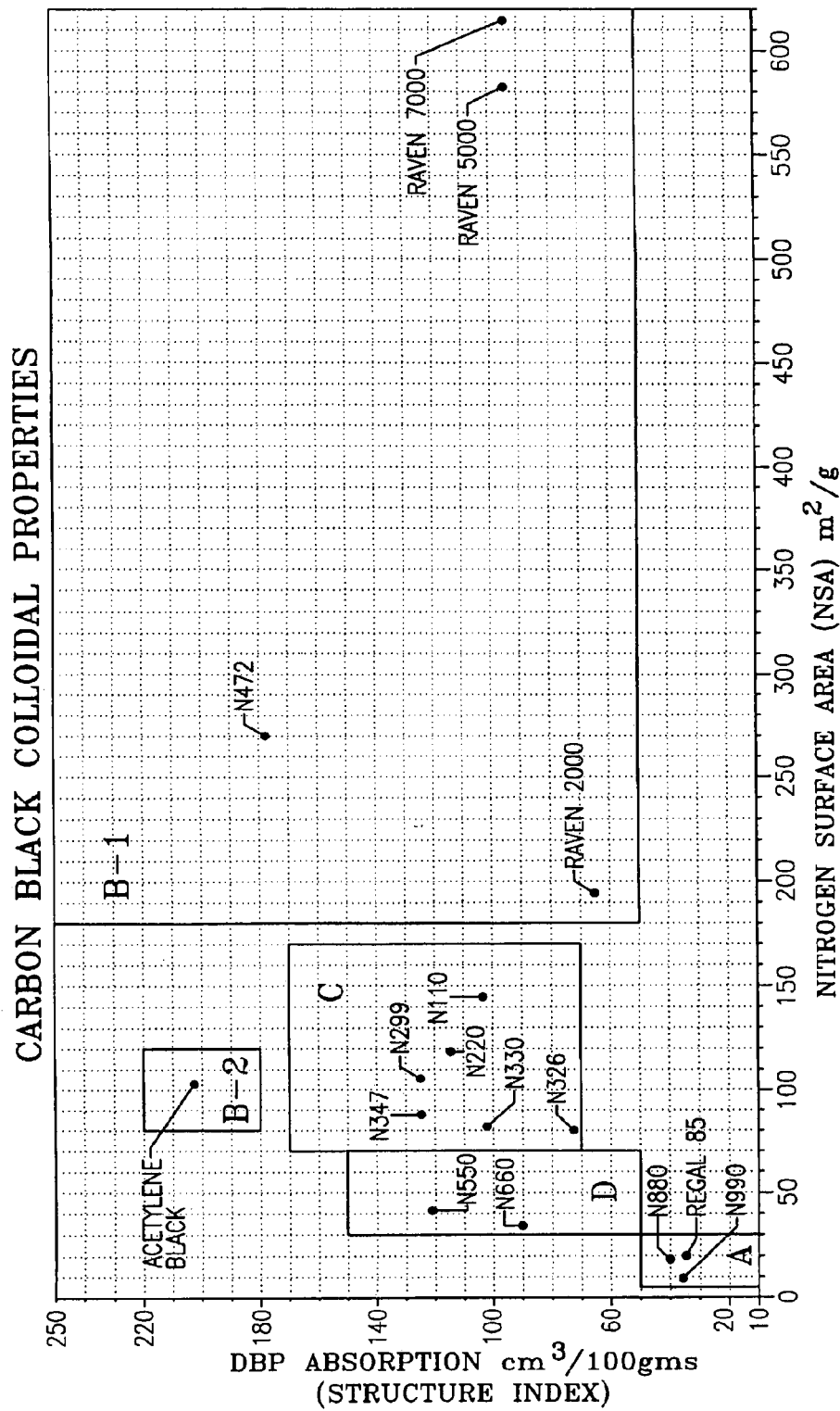

The invention relates to a tire with a component composed of a rubber composition containing at least two diverse carbon blacks. In one aspect such tire is a heavy tire and such component is a tread for a heavy tire which contains at least two diverse carbon blacks to aid in providing an improved path for thermal conductivity for a heavy tire with its relatively thick cross section such as, for example, its relatively thick tread.

In practice, such heavy tire is envisioned, for example, as a tire with a minimum thickness of 4 centimeters in its tread region which would normally comprise the tire tread and supporting cord reinforced rubber carcass and include a reinforcing cord reinforcing circumferential belt, if used. Thus such tire cross-section might be referred to as a minimum tread region thickness. Such heavy tires of significant tread region thickness may be, for example, off-the-road tires, airplane tires and relatively large truck tires. Such tires, except possibly for airplane tires with thin treads, may have treads which themselves may have a minimum thickness of 4 centimeters.

BACKGROUND OF THE INVENTION

Heavy tires with a relatively thick tread region cross-section typically experience a significant heat build up and a corresponding increase in operating temperature as the tire is being worked on an associated vehicle.

Such heavy tires may be, for example, various large off-the-road tires as well as various truck tires, as compared to significantly smaller tires intended for use on passenger automobiles. Heavy tires for consideration herein may have tread region cross-section of a thickness of two inches (5 centimeters) or more. Heat build up in a tire tread during the working of such heavy tires under load can be rapid to thereby cause such tire treads to operate at relatively high temperatures. For such heavy tires with relatively thick tread region cross-section, heat durability and wear resistance of the tire tread is a factor for the longevity of the tire itself.

Accordingly, it is desired to provide such heavy tires having relatively thick tread region cross-section with one or more components, particularly a tread, where the component, namely a tread, can serve as a thermally conductive path for dissipation of heat from the tire. While the tire tread is a principal consideration for such thermally conductive path, other tire components for such purpose include, for example, tire sidewalls, internal tire shoulder wedges, tire sidewall inserts and tire apexes (apexes in the sidewall adjacent to a tire bead). Large tires, such as for example off-the-road tires, may sometimes contain internal blocks of rubber in their shoulder region in the vicinity of the region where the tire sidewall portion joins the tread portion and such tire components are referred to herein as tire shoulder wedges. Significant heat build-up can occur in this region during the working of the tire so that a thermally conductive path involving such shoulder wedge is desirable. Virtually all large tires contain internal sidewall inserts adjacent to their beads which extend radially outward into the tire sidewall which are referred as tire sidewall apexes which add stiffness and stability to the tire sidewall. Significant heat build-up can occur in this region during the working of the tire, particularly for aircraft tires which experience heavy loads during airplane take-offs and landings, so that a thermally conductive path involving such apex is desirable. Some tires may contain additional internal sidewall rubber inserts in addition to a tire apex to provide additional stiffness and stability for a tire sidewall, particularly where the tire may be desired to operate under reduced internal air pressure, (e.g. where the tire goes flat) and such additional sidewall rubber inserts are simply referred to therein as tire sidewall rubber inserts. To reduce significant heat build-up for such sidewall inserts a thermally conductive path involving such sidewall rubber inserts is desirable.

In practice, it is well known that thermal conductivity of a rubber composition can typically be improved by simply increasing its reinforcing carbon black content. However, it is also well known that increasing the reinforcing carbon black content of a rubber composition typically makes it more hysteretic in nature and therefore more prone to excessive generation of heat as it is being worked. These two phenomena oppose each other for such a tire component.

Additionally, heavy tire treads may contain, if desired, significant amounts of silica reinforcement in place of a significant amount of carbon black. In general, the increase in the silica content of the tread, primarily because of the reduction in the carbon black content of the tread rubber composition, tends to thereby reduce the tread's thermal conductivity and consequently increase the tread's heat generation when in service under working conditions.

Thin strips of electrically conductive rubber compositions which contain significant amounts of rubber reinforcing carbon blacks have been used to provide an electrically conductive path for dissipation of static electricity through or around silica reinforced tire treads which have limited electrical conductivity because of their relatively low contents of carbon black reinforcement. Such strips therefore do not constitute the entire tire tread and are typically necessarily thin in nature in order to not disturb various physical properties desired for the tire tread itself, such as for example one or more of the tire's rolling resistance, wet traction and treadwear.

For this invention, however, it is desired to provide a significantly more substantial path for thermal conductivity for a heavy tire tread by maximizing thermal conductivity for an entire rubber component, particularly the tire tread. Indeed, insofar as providing thermal conductivity for dissipation of heat, it is readily recognized that a thin rubber strip of a thermally conductive rubber composition through, over or around a tire tread for such purpose would be impracticable for such purpose.

In practice, it is also known to use highly conductive carbon blacks, such as for example acetylene-derived carbon blacks, in rubber compositions used for tire cure bladders to provide a shorter cure time for tires where it is desired to provide a thermally conductive path for greater heat transfer through the tire curing bladder to the tire itself to shorten the respective tire cure cycle. However, such acetylene-derived carbon blacks are not normally used in rubber compositions for tire components and particularly not normally used for treads for heavy tires.

Reinforcement of various rubber compositions for various tire components has been heretofore suggested. For example, see U.S. Pat. Nos. 5,430,087 and 5,798,405. However, it is considered herein that use of a combination of diverse carbon blacks provided herein for heavy tire components, particularly tire treads, for providing a path of thermal conductivity is of a significant departure from past practice.

In the description of this invention, the term "phr," where used herein, and according to conventional practice, refers to "parts of a respective material per 100 parts by weight of rubber or elastomer".

In the description of this invention, the terms "rubber" and "elastomer," if used herein, may be used interchangeably, unless otherwise prescribed. The terms "rubber composition," "compounded rubber" and "rubber compound," if used herein, are used interchangeably to refer to "rubber which has been blended or mixed with various ingredients and materials" and such terms are well known to those having skill in the rubber mixing or rubber compounding art.

In the description of this invention, the DBP absorption values for carbon blacks is a dibutylphthalate value expressed in terms of $cm^3/100$ grams according to ASTM D2414. The Nitrogen Surface Area (referred to herein as "NSA") value is expressed in terms of square meters per gram ($m^2/g$) according to ASTM D3037.

SUMMARY AND DESCRIPTION OF THE INVENTION

In accordance with this invention, a pneumatic tire is provided with at least one component of a thermally conductive rubber composition comprised of, based upon parts by weight per 100 parts by weight of rubber (phr):

(A) 100 parts by weight of at least one diene-based elastomer, (B) about 25 to about 140, alternatively about 40 to about 110, phr of particulate carbon black and from zero to about 45, alternately about 5 to about 45 or from about 5 to about 30, phr of synthetic, amorphous silica, preferably precipitated silica, wherein said particulate carbon black is selected from categories of carbon blacks as:

(1a) Category (A) carbon black having a DBP value in a range of from 10 to about 50 $cm^3/100$ g and a NSA value in a range of from about 10 to about 30 $m^2/g$;

(1b) Category (B) carbon black as Category (B-1) carbon black having a DBP value in a range of from 50 to about 250 $cm^3/100$ g and a NSA value in a range of from about 180 to about 650 $m^2/g$ and Category (B-2) carbon black having a DBP value in a range of from 180 to about 220 $cm^3/100$ g and a NSA value in a range of from about 80 to about 120 $m^2/g$ (1c) Category (C) carbon black having a DBP value in a range of from 70 to about 170 $cm^3/100$ g and a NSA value in a range of from about 70 to about 170 $m^2/g$;

(1d) Category (D) carbon black having a DBP value in a range of from 50 to about 150 $cm^3/100$ g and a NSA value in a range of from about 30 to about 70 $m^2/g$;

wherein said pneumatic tire is a heavy tire having a tread with a thickness of at least 2 inches (at least 5 cm) and said tire component is said tread of said rubber composition which contains said carbon blacks as a combination of said Category (A), (B) and (C) carbon blacks as:

(2a) about 5 to about 50 phr of Category (A) carbon black and, correspondingly, about 20 to about 90 phr of Category (C) carbon black, or (2b) about 2 to about 20 phr of Category (B) carbon black and, correspondingly, about 20 to about 120 phr of Category (C) carbon black, or (2c) about 5 to about 25 phr of Category (A) carbon black, about 2 to about 10 phr of Category (B) carbon black and about 20 to about 100 phr of Category (C) carbon black; and wherein said pneumatic tire is a heavy tire having a component other than a tread of said rubber composition which contains said carbon blacks as a combination of at least two of Category (A), (B) and (D) carbon blacks as:

(3a) about 5 to about 50 phr of Category (A) carbon black and, correspondingly, about 20 to about 90 phr of Category (D) carbon black, or (3b) about 2 to about 20 phr of Category (B) carbon black and, correspondingly, about 20 to about 120 phr of Category (D) carbon black, or (3c) about 5 to about 25 phr of Category (A) carbon black, about 2 to about 10 phr of Category (B) carbon black and about 20 to about 100 phr of Category (D) carbon black.

Representative of components other than a tread are, for example, tire sidewall, and internal components such as, for example, the aforesaid tire shoulder wedge, sidewall rubber inserts, and sidewall apexes.

Preferably, the rubber composition for the heavy tire component is exclusive of silica, including precipitated silica, or in an alternative embodiment, contains only from about 5 to about 45 or, alternatively, from about 5 to about 30, phr of precipitated silica. Other forms of silica, including fumed silica which is different from precipitated silica, are not preferred.

In summary, such heavy tire tread is of rubber composition which contains a said carbon blacks in a combination of Categories A+C, B+C or A+B+C.

In summary, such heavy tire component other than a tread is of a rubber composition which contains said carbon blacks in a combination of Categories A+D, B+D, or A+B+D.

Therefore, for the heavy tire tread, a Category A non-reinforcing carbon black (a carbon black not normally used for diene-based elastomer reinforcing) is used in combination with a Category C carbon black (a carbon black normally considered as being highly reinforcing for diene-based elastomers) and/or a Category B carbon black (a carbon black not normally used for tire component rubber reinforcement).

In such manner, then a tread is provided for a heavy tire which contains a significant carbon black content, (including a Category C carbon black for promoting a reduction in tread rolling resistance and reduction in tread wear) for increasing thermal conductivity of the tread rubber composition so that the tread itself becomes a thermal conductive path for dissipating heat from the tire as it is being worked. In addition, a significant portion of the carbon black content (particularly the Category A carbon black) is of a carbon black of limitive diene-based elastomer reinforcement property, or ability, so that the hysteresis of the tread rubber composition, and its associated tendency to increase in temperature as it is being worked, is not significantly adversely affected.

Therefore, for a component of a heavy tire other than a tread, a Category A non-reinforcing carbon black (a carbon black not normally used for diene-based elastomer reinforcing) is used in combination with a Category D carbon black (a carbon black normally considered as being moderately reinforcing for diene-based elastomers) and/or a Category B carbon black (a carbon black not conventionally used for reinforcing diene-based elastomers for various tire components).

In such manner, then such component other than a tread is provided which contains a significant carbon black content, (including a Category D carbon black for promoting reinforcement of the tire sidewall rubber insert) for increasing thermal conductivity of the sidewall insert rubber composition so that the sidewall insert itself becomes a thermal conductive path for dissipating heat so that it can become cooler running in nature as the tire is being worked. In addition, a significant portion of the carbon black content (particularly the Category A carbon black) is of a carbon black of limitive diene-based elastomer reinforcement property, or ability, so that the hysteresis of the sidewall insert rubber composition, and the associated tendency of the rubber composition to increase in temperature as it is being worked, is not significantly adversely affected.

Representative of relatively non-reinforcing carbon blacks for diene-based elastomers of Category (A) are, for example, N880 and N990 carbon blacks (ASTM designated carbon blacks) and Regal 85™ carbon black from the Cabot Corporation reportedly having DBP values of 40, 36 and 34 $cm^3/100$ gms, respectively and NSA values of 18, 9 and 20 $m^2/g$, respectively.

Representative of highly reinforcing carbon blacks for diene-based elastomers of Category (B) are, for example, Category (B-1) carbon blacks as N472 carbon black (ASTM designation), and Raven 2000, Raven 5000 and Raven 7000 carbon blacks from the Columbian Carbon Company reportedly having DBP values of 178, 65, 95 and 95 $cm^3/100$ gms, respectively and NSA values of 270, 194, 583 and 613 $m^2/g$, respectively, as well as a Category (B-2) carbon black as an acetylene derived carbon black such as "acetylene carbon black" from Chevron Chemical Company reportedly a DBP value of about 202 $cm^3/100$ gms and a NSA value of about 102 $m^2/g$.

Representative of moderately reinforcing carbon blacks of Category (C) for diene-based elastomers are, for example, N110, N220, N299, N326, N330 and N347 carbon blacks (ASTM designations) reportedly having DBP values of 113, 114, 124, 72, 102 and 124 $cm^3/100$ gms, respectively and NSA values of 143, 119, 106, 80, 81, and 88 $m^2/g$, respectively.

Representative of intermediate reinforcing carbon blacks of Category (D) for diene-based elastomers are, for example, N550 and N660 (ASTM designations), having reported DBP values of 121 and 90 $cm^3/100$ gms, respectively and NSA values of 41 and 34 $m^2/g$, respectively.

Carbon black properties such as DBP values and nitrogen surface area values are well known to those having skill in such art.

For example, the DBP (dibutylphthalate) values for carbon black is normally considered to be a measure of its structure, or aggregate size and is expressed in cubic centimeters per 100 grams of carbon black. A higher DBP adsorption number indicative of larger aggregates which, in turn, is indicative of higher structure for the carbon black.

For example, the nitrogen surface area (NSA) values and iodine values for carbon black are normally considered to be a measure of its surface area and is expressed in units of square meters/gram ($m^2/g$). A higher NSA value is indicative of smaller particle size which, in turn, is indicative of higher surface area for the carbon black and typically a higher reinforcing carbon black for elastomers.

DBP Numbers for various carbon blacks, together with associated ASTM designated N-numbers may be found, for example, in *The Vanderbilt Rubber Handbook*, Thirteenth Edition (1990), Page 417.

An essential part of the present invention is the use of a mixture of at least two diverse carbon blacks having both a significantly different structure (significantly different DBP value) and a significantly different surface area and size (significantly different NSA value).

The Category (A) carbon blacks, with their significantly low DBP and low NSA values, are normally considered as non-reinforcing carbon blacks which are typically not used as a reinforcing fillers for diene elastomer based rubber compositions for tires.

The Category (B) carbon blacks with their significantly high NSA value are also not typically used in diene based elastomer compositions for tires because of their fine particle size and difficulty associated with mixing them into rubber compositions.

The Category (C) carbon blacks with their relatively intermediate defined ranges of DBP and NSA combinations of values are considered as representing high reinforcing carbon blacks which are typically used in diene based elastomer compositions for tire tread applications.

The Category (D) carbon blacks with their relatively lower NSA values than the Category C carbon blacks are typically used as medium reinforcing carbon blacks for diene based elastomer compositions for tire components other than tire treads such as sidewalls and, for example, sidewall rubber inserts.

BRIEF DESCRIPTION OF THE ACCOMPANYING DRAWING

The accompanying drawing is presented in a form of a graph to provide a further understanding of the invention in which the Category (A), Category (B), Category (C) and Category (D) carbon blacks are presented in blocked out regions according to their DBP and NSA values in order to better appreciate their spaced apart characterizations.

The Accompanying Drawing (Graphical Presentation)

The accompanying graphical presentation presents the Categorized carbon blacks with a reference to their DBP values (y-axis) and NSA values (x-axis).

Box A of the drawing is presented to encompass the Category (A) carbon blacks having DBP values in a range from 10 to 50 $cm^3/100$ gm and NSA values in a range of from 10 to 30 $m^2/g$.

Box B-1 of the drawing is presented to encompass the Category (B) carbon blacks having DBP values in a range from 50 to 250 $cm^3/100$ gm and NSA values in a range of from 180 to 600 $m^2/g$.

Box B-2 of the drawing is presented to encompass the Category (B) carbon blacks having DBP values in a range from 180 to 220 $cm^3/100$ gm and NSA values in a range of from 80 to 120 $m^2/g$.

Box C of the drawing is presented to encompass the Category (C) carbon blacks having DBP values in a range from 70 to 170 $cm^3/100$ gm and NSA values in a range of from 70 to 170 $m^2/g$.

Box D of the drawing is presented to encompass the Category (D) carbon blacks having DBP values in a range from 50 to 150 $cm^3/100$ gm and NSA values in a range of from 30 to 70 $m^2/g$.

For Box A, the aforesaid N880, N990 and Regal 85 carbon blacks are illustrated.

For Box B-1, the aforesaid N472, Raven 2000, Raven 5000 and Raven 7000 carbon blacks are illustrated.

For Box B-2, the aforesaid acetylene black type of carbon black is illustrated.

For Box C, the aforesaid N110, N220, N299, N326, N330 and N347 carbon blacks are illustrated.

For Box D, the aforesaid N550 and N660 carbon blacks are illustrated.

It can readily be seen from the drawing that each of the carbon black types (A), (B), (C) and (D) have distinct DBP and NSA values.

In the practice of this invention, as hereinbefore pointed out, the rubber composition is comprised of at least one diene-based elastomer, or rubber. Such elastomers are typically selected from homopolymers and copolymers of conjugated dienes and copolymers of conjugated diene(s) and vinyl aromatic compound such as, for example, styrene and alpha-methylstyrene. Such dienes may, for example, be selected from isoprene and 1,3-butadiene and such vinyl aromatic compounds may be selected from styrene and alpha-methylstyrene, preferably styrene.

Representative of such elastomers, or rubbers, are, for example, elastomers selected from at least one of cis 1,4-polyisoprene rubber (natural and/or synthetic, and preferably natural rubber), 3,4-polyisoprene rubber, styrene/butadiene copolymer rubbers, isoprene/butadiene copolymer rubbers, styrene/isoprene copolymer rubbers, styrene/isoprene/butadiene terpolymer rubbers, cis 1,4-polybutadiene rubber, trans 1,4-polybutadiene rubber (70 to 95 percent trans), low vinyl polybutadiene rubber (10 to 30 percent vinyl), high vinyl polybutadiene rubber (30 to 90 percent vinyl).

In one aspect, the rubber is preferably comprised of at least two diene-based rubbers. For example, a combination of two or more rubbers is preferred such as cis 1,4-polyisoprene rubber (natural or synthetic, although natural is usually preferred), 3,4-polyisoprene rubber, isoprene/butadiene copolymer rubber, styrene/isoprene/butadiene rubber, emulsion and solution polymerization derived styrene/butadiene rubbers, cis 1,4-polybutadiene rubbers, medium vinyl polybutadiene rubbers (30 to 55 percent vinyl), high vinyl polybutadiene rubbers (55 to 90 percent vinyl) and emulsion polymerization prepared butadiene/acrylonitrile copolymers.

It is readily understood by those having skill in the art that the rubber composition would be compounded by methods generally known in the rubber compounding art, such as mixing the various sulfur-vulcanizable constituent rubbers with various commonly used additive materials. Such materials include for example, and in addition to the aforesaid carbon black combinations, curing aids, such as sulfur, activators, retarders and accelerators, processing additives, such as oils, resins including tackifying resins, coupling agent, and plasticizers, fillers, pigments, fatty acid, zinc oxide, waxes, antioxidants and antiozonants and peptizing agents. As known to those skilled in the art, depending on the intended use of the sulfur-vulcanizable and sulfur-vulcanized material (rubbers), the additives mentioned above are selected and commonly used in conventional amounts.

The composition of the present invention may contain conventional amounts of known rubber chemicals.

Typical amounts of tackifier resins, if used, may comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others such as, for example, those disclosed in the Vanderbilt Rubber Handbook (1978), pages 344-346. Typical amounts of antiozonants comprise about 1 to 5 phr. Typical amounts of fatty acids, if used, which are usually comprised primarily of stearic acid, comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The vulcanization of the rubber composition is conducted in the presence of a sulfur-vulcanizing agent. Examples of suitable sulfur-vulcanizing agents include elemental sulfur (free sulfur) or sulfur-donating vulcanizing agents, for example, an amine disulfide, polymeric polysulfide or sulfur olefin adducts. Preferably, the sulfur-vulcanizing agent is elemental sulfur. As known to those skilled in the art, sulfur-vulcanizing agents are used in an amount ranging from about 0.5 to about 4 phr, or even, in some circumstances, up to about 8 phr, with a range of from about 1.5 to about 2.5, sometimes from about 2 to about 2.5, being preferred.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 2, phr. In another embodiment, combinations of a primary and a secondary accelerator might be used with the secondary accelerator being used in amounts of about 0.05 to about 5 phr in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The presence and relative amounts of most of the above additives are not considered to be an aspect of the present invention which is more primarily directed to the utilization of the aforesaid combinations of categories of carbon blacks.

The rubber composition may be and is preferably prepared by thermomechanically working and mixing the diene-based rubber, carbon blacks and other rubber compounding ingredients, exclusive of the rubber curatives, in at least one sequential mixing step with at least one mechanical mixer, usually referred to as "non-productive" mix stage(s), to a temperature which may be in a range of, for example, about 160° C. to about 190° for a sufficient duration of time, which may be, for example, within about 4 to about 8 minutes, followed by a final mix stage in which the curatives, such as sulfur and accelerators, are added and mixed therewith which may be, for example, about 1 to about 4 minutes to a temperature which may be, for example, within a range of about 90° C. to about 125° C. The terms "non-productive" and "productive" mix stages are well known to those having skill in the rubber mixing art.

It is to be appreciated that the rubber composition is conventionally cooled to a temperature below about 40° C. between the aforesaid mix stages.

It is to be further appreciated that the aforesaid duration of time for the required temperature maintenance for the mixing process(es) during the non-productive mix stages can be accomplished, for example, by (A) adjusting the motor speed of the mixer, namely reducing the motor speed after the desired temperature of the rubber composition is reached, in a variable speed mixer or by (B) utilizing two or more mix stages sufficient to satisfy the duration requirement for the aforesaid maximum mixing temperature maintenance.

Vulcanization of the rubber composition of the present invention is generally carried out at conventional temperatures which may range, for example, from about 100° C. to about 200° C. Usually preferably, the vulcanization is conducted at temperatures ranging from 110° C. to 180° C. Any of the usual vulcanization processes may be used such as heating in a press or mold, heating with superheated steam or hot air or in a salt bath.

Upon vulcanization of the sulfur-vulcanized composition, the rubber composition of this invention can be used for various purposes. For example, the sulfur-vulcanized rubber composition may be in the form of a tread for a pneumatic tire which is the subject of this invention. Such tires can be built, shaped, molded and cured by various methods which are known and will be readily apparent to those having skill in such art.

The invention may be better understood by reference to the following examples in which the parts and percentages are by weight unless otherwise indicated.

EXAMPLE I

Rubber compositions are prepared which are reinforced with a combination of carbon black and precipitated silica, together with a coupling agent for the silica.

Control Sample 1 contains a conventional Category (C) rubber reinforcing carbon black as N347 which is normally considered as being a relatively high reinforcing carbon black for use in tire tread rubber composition.

Samples 2 through 4 contain various amounts of a relatively low rubber reinforcing Category (A) carbon black, as the aforesaid Regal 85 carbon black, in addition to the Category (C) N347 rubber reinforcing carbon black and therefore contain a combination of the diverse carbon blacks.

The rubber compositions contain natural cis 1,4-polyisoprene rubber and additional compounding ingredients.

The compositions were prepared by mixing the ingredients in several stages, namely, one non-productive stage (without the curatives) followed by a productive mix stage (for the curatives), then the resulting composition was cured under conditions of elevated pressure and temperature.

For the non-productive mixing stage, exclusive of the accelerator(s) and sulfur curatives which are mixed (added) in the final, productive mixing stage, the ingredients, including the natural rubber, are mixed in an internal rubber mixer for about 4 minutes to a temperature of about 160° C. following which the rubber composition is removed from the mixer, roll milled, sheeted out and allowed to cool to a temperature below 40° C.

In a subsequent productive mixing stage the curatives are mixed with the rubber composition (mixture) in an internal rubber mixer, namely sulfur and vulcanization accelerator (s), for about 2 minutes to a temperature of about 110° C. following which the rubber composition is removed from the mixer, roll milled, sheeted out and allowed to cool to a temperature below 40° C.

The rubber compositions are illustrated in the following Table 1.

TABLE 1

|  | Control Sample 1 | Sample 2 | Sample 3 | Sample 4 |
|---|---|---|---|---|
| Non-Productive Mixing |  |  |  |  |
| Natural rubber | 100 | 100 | 100 | 100 |
| Category (A) carbon black[1] | 0 | 16 | 20 | 24 |
| Category (C) carbon black[2] | 30 | 22 | 22 | 22 |
| Silica[3] | 20 | 20 | 20 | 20 |
| Processing oil and wax[4] | 5 | 5 | 5 | 5 |
| Fatty acid[5] | 3.5 | 3.5 | 3.5 | 3.5 |
| Zinc oxide | 3 | 3 | 3 | 3 |
| Resorcinol | 1 | 1 | 1 | 1 |
| Antidegradants[6] | 4.5 | 4.5 | 4.5 | 4.5 |
| Coupling agent[7] | 2 | 2 | 2 | 2 |
| Productive Mixing |  |  |  |  |
| Sulfur | 1.5 | 1.5 | 1.5 | 1.5 |
| Accelerator(s)[8] | 1.1 | 1.1 | 1.1 | 1.1 |

[1]Regal85 ™, a non reinforcing carbon black from Cabot Corporation Company reportedly having a DBP value of about 34 $cm^3$/100 gm and a NSA value of about 20 $m^2$/g
[2]N347, an ASTM designation, reportedly having a DBP value of about 124 $cm^3$/100 gm and a NSA value of about 88 $m^2$/g
[3]Synthetic, amorphous precipitated silica as HiSil 243 ™ from PPG Industries
[4]Rubber processing oil and microcrystalline wax as processing aids
[5]Primarily stearic acid
[6]Mixture of amine based antioxidant and antizonant
[7]Composite of a bis(3-triethoxysilylpropyl) tetrasulfide having an average in a range of 3.5 to 4 connecting sulfur atoms in its polysulfidic bridge and carbon in a 50/50 weight obtained as X50S from the Degussa Company, thus 50 percent active, and reported in the Table as the composite
[8]Sulfenamide type(s)

Various physical properties of the Samples are reported in the following Table 2. Where the physical properties are of pre-cured Samples, the Samples were cured at a temperature of about 150° C. for about 60 minutes.

TABLE 2

|  | Control Sample 1 | Sample 2 | Sample 3 | Sample 4 |
|---|---|---|---|---|
| Category (A) carbon black | 0 | 16 | 20 | 24 |
| Category (C) carbon black | 30 | 22 | 22 | 22 |
| Stress-strain |  |  |  |  |
| Ultimate tensile strength (MPa) | 16.2 | 15.7 | 16.4 | 15.9 |
| Ultimate elongation at break (%) | 370 | 355 | 355 | 335 |
| 300% ring modulus (MPa) | 13.6 | 14.2 | 15.0 | 15.4 |
| Hardness (Shore A), 100° C. | 58 | 60 | 62 | 62 |
| Tear strength, (95° C.), Newtons | 133 | 113 | 108 | 94 |
| DIN Abrasion, relative volume loss | 155 | 169 | 157 | 148 |
| Thermal conductivity W/mk | 0.258 | 0.259 | 0.269 | 0.275 |

The DIN abrasion test is sometimes referred to as "DIN 53516" and is indicative of rubber wear due to abrasion. The DIN abrasion test is well known to those skilled in such art. The DIN abrasion value is reported as a relative volume loss compared to a control. A higher value is indicative of a larger amount of rubber removed by abrasion and, thus, a greater amount of wear for the rubber sample.

The thermal conductivity is a measure of heat transfer rate through a cured rubber composition. Thus, a higher value is indicative of faster rate of heat dissipation by the rubber composition. The test values are reported in terms of watts per meter at a test temperature in Kelvin temperature units (100° C. converted to Kelvin temperature) (W/mk).

The ultimate tensile strength, ultimate elongation, 300 percent ring modulus, Shore A hardness (100° C.) methods of rubber characterization are well known to those having skill in such art.

It can be seen from Table 2 that that the thermal conductivity of Samples 2 through 4 is significantly increased, or improved, as compared to Control Sample 1 without a significant change or loss of other significant physical properties.

EXAMPLE II

Rubber compositions are prepared which are reinforced with a combination of carbon black and precipitated silica, together with a coupling agent for the silica and identified as Control Sample 5 and Sample 6.

The Samples were prepared of the rubber compositions and with mixing procedure as presented in Example I except for the carbon black of Sample 6.

In particular, Control Sample 5 used the N347 Category (C) carbon black.

Sample 6 used Raven 2000, a Category (B-1) carbon black in addition to the N347 Category (C) carbon black.

Various physical properties of the Samples are reported in the following Table 3. Where the physical properties are of pre-cured Samples, the Samples were cured at a temperature of about 125° C. for about 270 minutes.

TABLE 3

|  | Control Sample 5 | Sample 6 |
|---|---|---|
| Category (B-1) Raven 2000 carbon black | 0 | 5 |
| Category (C) N347 carbon black | 30 | 30 |
| Stress-strain |  |  |
| Ultimate tensile strength (MPa) | 22.9 | 23.4 |
| Ultimate elongation at break (%) | 480 | 490 |
| 300% ring modulus (MPa) | 12.5 | 12.9 |
| Hardness (Shore A), 100° C. | 62 | 64 |
| Tear strength, (95° C.), Newtons | 236 | 237 |
| DIN Abrasion, relative volume loss | 133 | 143 |
| Thermal conductivity W/mk | 0.231 | 0.248 |

It can be seen from Table 3 that the thermal conductivity of Sample 6 is significantly increased, or improved, as compared to Control Sample 5 without a significant change or loss of other significant physical properties.

EXAMPLE III

Rubber compositions are prepared which are reinforced with a combination of carbon black and precipitated silica, together with a coupling agent for the silica and identified as Control Sample 7 and Samples 8 and 9. The Samples were prepared of the rubber compositions and with mixing procedure as presented in Example I except for the carbon blacks.

In particular, Control Sample 7 used the N347 Category (C) carbon black as Control Sample A of Example I.

Samples 8 and 9 used a Category (B-2) acetylene derived carbon black with the N347 Category (C) carbon black.

Various physical properties of the Samples are reported in the following Table 4. Where the physical properties are of pre-cured Samples, the Samples were cured at a temperature of about 125° C. for about 270 minutes.

TABLE 4

|  | Control Sample 7 | Sample 8 | Sample 9 |
|---|---|---|---|
| Category (B-2) acetylene carbon black | 0 | 10 | 20 |
| Category (C) N347 carbon black | 30 | 30 | 30 |
| Stress-strain |  |  |  |
| Ultimate tensile strength (MPa) | 23.1 | 20.5 | 20.6 |
| Ultimate elongation at break (%) | 530 | 430 | 405 |
| 300% ring modulus (MPa) | 11.2 | 14.6 | 16.7 |
| Hardness (Shore A), 100° C. | 60 | 65 | 70 |
| Tear strength, (95° C.), Newtons | 236 | 195 | 146 |
| DIN Abrasion, relative volume loss | 138 | 143 | 141 |
| Thermal conductivity W/mk | 0.231 | 0.262 | 0.286 |

It can be seen from Table 4 that the thermal conductivity of Sample 8 is significantly increased, or improved, as compared to Control Sample 7.

It can be seen from Table 4 that the thermal conductivity of Sample 9 is significantly increased, or improved, as compared to Control Sample 7 although there is an observed increase in 300 percent modulus accompanied by a reduction in tear strength.

In order to substantially maintain the modulus/tear physical property tradeoff of Samples 9, slightly less curative (sulfur plus accelerator) was used using the acetylene carbon black at 20 phr.

While certain representative embodiments and details have been shown for the purpose of illustrating the invention, it will be apparent to those skilled in this art that various changes and modifications may be made therein without departing from the spirit or scope of the invention.

What is claimed is:

1. A heavy duty pneumatic tire with a tread having a cross-section of a minimum thickness of 4 centimeters and is a thermally conductive rubber composition comprised of, based upon parts by weight per 100 parts by weight of rubber (phr):

(A) 100 parts by weight of at least one diene-based elastomer, (B) about 25 to about 140 phr of particulate carbon black and from zero to about 45 phr of synthetic, amorphous silica;

wherein said particulate carbon black is;

(1) about 2 to about 20 phr of Category (B-1) carbon black and, correspondingly, about 20 to about 120 phr Category (C) carbon black, or (2) about 5 to about 25 phr of Category (A) carbon black, about 2 to about 10 phr of Category (B-1) carbon black and about 20 to about 100 phr of Category (C) carbon black, or (3) about 5 to about 25 phr of Category (A) carbon black, about 2 to about 10 phr of Category (B-2) carbon black and about 20 to about 100 Category (C) carbon black;

wherein said Category (A) carbon black has a DBP value in a range of from 10 to about 50 cm$^3$/100 g and a NSA value in a range of from about 10 to about 30 m$^2$/g;

wherein said Category (C) carbon black has a DBP value in a range of from 70 to about 170 cm$^3$/100 g and a NSA value in a range of from about 70 to about 170 m$^2$/g; and wherein said Category (B-1) carbon black has a DBP value in a range of from 50 to about 250 cm$^3$/100 g and a NSA value in a range of from about 180 to about 600 m$^2$/g, and wherein said Category (B-2) carbon black has a DBP value in a range of from 180 to about 220 cm$^3$/100 g and a NSA value in a range of from about 80 to about 120 m$^2$/g.

2. The tire of claim 1 wherein said carbon black is a combination of about 2 to about 20 phr of Category (B-1) carbon black and, correspondingly, about 20 to about 120 phr of Category (C) carbon black.

3. The tire of claim 1 wherein said carbon black is a combination about 5 to about 25 phr of Category (A) carbon black, about 2 to about 10 phr of Category (B-1) carbon black and about 20 to about 100 phr of Category (C) carbon black.

4. The tire of claim 1 wherein said carbon black is a combination about 5 to about 25 phr of Category (A) carbon black, about 2 to about 10 phr of Category (B-2) carbon black and about 20 to about 100 phr of Category (C) carbon black.

* * * * *